United States Patent Office 3,726,902
Patented Apr. 10, 1973

3,726,902
FURFURYL AMINO-COUMARINS
Rudi Beyerle, Bruchköbel, Ingeburg Lydia Katharina Stachel, Frankfurt am Main-Fechenheim, Rolf-Eberhard Nitz, Bergen-Enkheim, and Klaus Resag and Eckhard Schraven, Frankfurt am Main-Fechenheim, Germany, assignors to Casella Farbwerke Mainkur Aktiengesellschaft, Frankfurt am Main-Fechenheim, Germany
No Drawing. Original application Jan. 8, 1969, Ser. No. 789,919, now Patent No. 3,652,557. Divided and this application July 27, 1971, Ser. No. 166,598
Claims priority, application Germany, Jan. 19, 1968, P 16 68 877.0
Int. Cl. C07d 7/26
U.S. Cl. 260—343.2 R          3 Claims

ABSTRACT OF THE DISCLOSURE

The present invention relates to new coumarin compounds useful as coronary dilators and having the formula

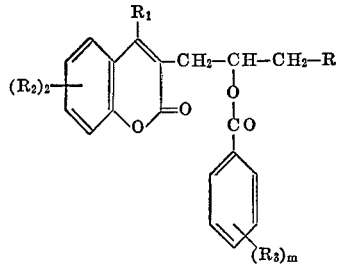

or the hydrochloric acid addition salts thereof, and to methods of preparing same either by acylating, in the presence of acid-binding agents, if desired, coumarin derivatives having the formula

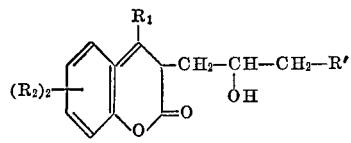

with acylating agents selected from the group consisting of alkoxybenzoic acid having the formula

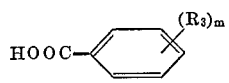

and functional derivatives thereof, or by condensing, in the presence of acid-binding agents, if desired, coumarin derivatives having the formula

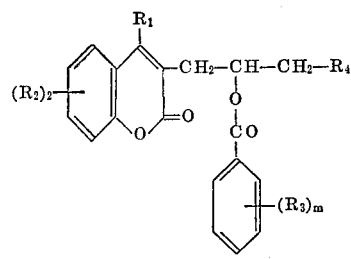

with an amine having the formula RH, wherein R is selected from secondary furfurylamino and secondary tetrahydrofurfurylamino, which is bound via the nitrogen atom; $R_1$ is selected from the group consisting of alkyl radicals having 1–4 carbon atoms and phenyl; $R_2$ is selected from the group consisting of 5,6-, 6,7-, and 7,8-positioned alkoxy groups having 1–4 carbon atoms; $R_3$ is selected from alkoxy groups having 1–4 carbon atoms; $R_4$ is selected from the group consisting of chlorine and bromine; $R'$ is selected from the group consisting of secondary furfurylamino and secondary tetrahydrofurfurylamino; and $m$ is selected from the group consisting of 1, 2, and 3.

The present application is a division of our U.S. Ser. No. 789,919, filed Jan. 8, 1969, now U.S. Pat. No. 3,652,557.

The present application relates to new coumarin compounds useful as coronary dilators and having the formula

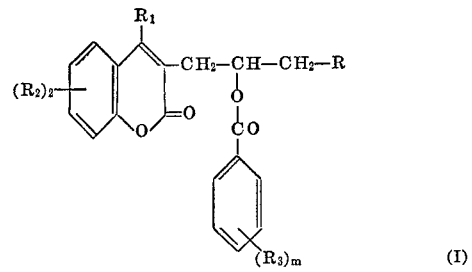

or the hydrochloric acid addition salts thereof, and to methods of preparing the same either by acylating, in the presence of acid-binding agents, if desired, coumarin derivatives having the formula

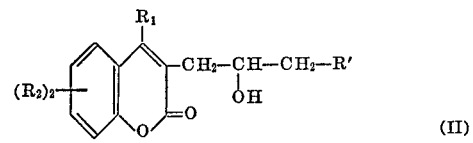

with acylating agents selected from the group consisting of alkoxybenzoic acid having the formula

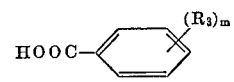

and functional derivatives thereof, or by condensing, in the presence of acid-binding agents, if desired, coumarin derivatives having the formula

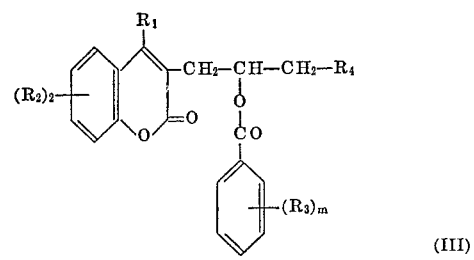

with an amine having the formula RH, wherein R is selected from secondary furfurylamino and secondary tetrahydrofurfurylamino; $R_1$ is selected from the group consisting of alkyl radicals having 1–4 carbon atoms and phenyl; $R_2$ is selected from the group consisting of 5,6-, 6,7-, and 7,8-positioned alkoxy groups having 1–4 carbon atoms; $R_3$ is selected from alkoxy groups having 1–4 carbon atoms; $R_4$ is selected from the group consisting of chlorine and bromine; $R'$ is selected from the group consisting of secondary furfurylamino and secondary tetrahydrofurfurylamino; and $m$ is selected from the group consisting of 1, 2, and 3.

The radical of a secondary amine R may derive from furfuryl amine or tetrahydrofurfuryl amine.

The coumarin derivatives according to the present invention are obtained in the different known per se methods, the method chosen depending on the envisaged constitution of the final product.

The simplest method of obtaining the coumarin derivatives according to the present invention is to acylate, optionally in the presence of an acid-binding agent, coumarin derivatives having the structural formula

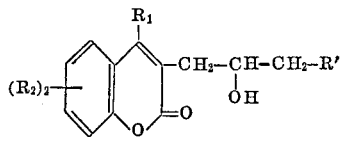

wherein R' means a radical of secondary furfuryl amine or secondary tetrahydrofurfuryl amine, with an alkoxybenzoic acid having the structural formula

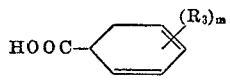

or a functional derivative thereof.

The 3-γ-amino-β-hydroxy-propyl-coumarins required as starting materials for this process are obtained by reacting according to known methods, for instance analogously to the teachings of British Pats. 1,067,626 and 1,135,907, the corresponding amines with the 3-γ-halogen-β-hydroxy-propyl-coumarins, or with the corresponding 3-(2',3'-epoxypropyl)-coumarins. Even if primary amines are used as starting materials for this process, it is surprising that the substitution of the halogen atom of 3-γ-halogen-β-hydroxypropyl-coumarins by the amine radical gives satisfactory yields without involving any adverse side reactions. By subsequent alkylation the hydrogen atom of the formed secondary amino group may be substituted by an alkyl or aralkyl radical.

Another method of preparing the compounds of the present invention which have the general Formula I consists in that coumarin derivatives of the general formula

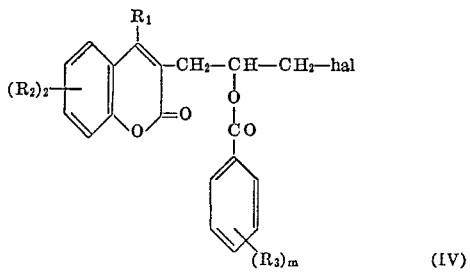

wherein hal stands for a halogen atom, are reacted, optionally in the presence of an acid-binding agent, with an amine of the general formula RH.

Particularly used as amines or bases having the general formula RH are all compounds mentioned above in connection with the definition of the radical R.

The starting materials of the general Formula IV are obtained by acylating the corresponding 3-γ-halogen-β-hydroxy-propyl-coumarins with an alkoxybenzoic acid of the general formula

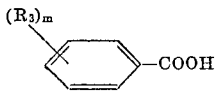

or with a functional derivative thereof. The reaction may be performed in the presence or absence of an inert solvent and possibly in the presence of an acid-binding agent.

As low-molecular alkyl radicals $R_1$ and alkoxy radicals $R_2$ or $R_3$ are used particularly those having 1–4 carbon atoms.

The coumarin derivatives obtainable under the present invention are valuable pharmaceutics. In particular, they are excellent coronary dilators and, in this respect, superior to other known substances having such properties. Their salts are colorless, crystalline substances that easily dissolve in water.

With respect to the change in the oxygen tension in the coronary veinous blood, the pharmacological investigation of the vasodilator action on the coronary vessels was carried out in dogs according to the methods described in W. K. A. Schaper and his co-workers (see W. K. A. Schaper, R. Xhonneux, and J. M. Bogaard, "Uber die kontinuierliche Messung des Sauerstoffdruckes im venösen Coronarblut" (Naunyn-Schmiedeberg's Arch. exp. Path. u. Pharmak., 245, 383–389 (1963)). The test preparations were applied intravenously to the narcotized and spontaneously breathing animals. On these test conditions and dilatation of the coronary arteries caused by the test substances along with the increase in the coronary blood flow led to an increase in the oxygen tension in the coronary veinous blood. This oxygen tension was measured according to polarographic methods by means of a platin electrode of the Gleichmann-Lübbers type (see U. Gleichmann and D. W. Luebbers, "Die Messung des Sauerstoffdruckes in Gasen und Flüssigkeiten mit der Platin-Elektrode unter besonderer Berücksichtigung der Messung im Blut," Pflügers Arch., 271, 431–455 (1960)). The heart rate was continuously measured by electronic methods from systolic peaks of the arterial blood pressure. The arterial blood pressure was measured in the known manner in the femoral artery with the aid of an electromanometer of the Statham-strain-gauge type.

The following table gives the results of the pharmacological investigations which were carried through. The preparations were tested in the form of their respective dihydrochlorides:

| Preparation | $LD_{50}$ g./kg., mouse | Dosage, mg./kg. i.v. | Maximal increase in oxygen tension in the coronary veinous blood in— | | Maximal change in the heart rate in— | | Maximal change in the blood pressure (systolic/diastolic) in— | |
|---|---|---|---|---|---|---|---|---|
| | | | Percent | Minutes | Percent | Minutes | Percent | Minutes |
| 3-[α-(N-methyl-N-furfurylamino)-β-(3,4,5-trimethoxybenzoxy)-propyl]-4-methyl-7,8-dimethoxy-coumarin | [1] 0.145 | 0.5 | +135 | >10 | −8 | >15 | −40/−38 | >10 |
| 3-[α-(N-methyl-N-tetrahydrofurfurylamino)-β-(3,4,5-trimethoxybenzoxy)-propyl]-4-methyl-7,8-dimethoxy-coumarin | [2] 0.35 | 0.5 | −108 | >45 | −7 | 45 | −30/−35 | >45 |

[1] I.u.
[2] I.p.

In the preparation of dragées and tablets containing as essential active ingredient the coumarin derivatives of our invention these substances may be admixed with the conventional solid tabletting adjuvants, such as starch, lactose, talc and the like. Any of the tabletting materials and carriers customary in pharmaceutical practice may be employed.

For the preparation of the injection solution the hydrochlorides of the coumarin derivatives are particularly suited since they have mostly a good water-solubility. Injection solutions of water-insoluble products may of course be prepared in the conventional manner by concurrently using well known suspending agents, emulsifiers and/or solubilizers.

For a better understanding of the nature and the objects of this invention, reference should be made to the accompanying example which is of an illustrative rather than a limiting nature. Unless otherwise stated, all temperatures given are in degrees centigrade.

EXAMPLE 42.75 g. (0.1 mol) 3 - [γ-N-methyl-N-(tetrahydrofurfuryl)-amino-β-hydroxy-propyl]-4-methyl-7,8-dimethoxy-coumarin hydrochloride are suspended, with the addition of 25.25 g. (0.25 mol) triethylamine, in 800 cc. anhydrous benzene. Subsequently, a solution consisting of 34.5 g. (0.15 mol) 3,4,5-trimethoxybenzoylchloride in 150 cc. anhydrous benzene is added dropwise while stirring at room temperature, the reaction mixture is heated to the boil and stirred for 6 hours under reflux. The benzene solution is then sucked off, while hot, from the separated triethylamine hydrochloride and the filtrate is evaporated to dryness in vacuo. The residue is dissolved in ethyl acetate. The ethyl acetate solution is washed with an aqueous sodium hydroxide solution and then with water. By introducing gaseous hydrchloric acid one obtains the 3-[γ - N - methyl-N-(tetrahydrofurfuryl)-amino-β-3,4,5-trimethoxybenzoxy-propyl] - 4-methyl - 7,8-dimethoxy-coumarin hydrochloride in the form of colorless crystals melting at 115°.

Yield: 44 g.=70.6% of the theoretical.

The 3 - [γ-N-methyl-N-(tetrahydrofurfuryl)-amino-β-hydroxy-propyl] - 4 - methyl-7,8-dimethoxy-coumarin hydrochloride employed as starting material is prepared as follows:

(a) 31.3 g. (0.1 mol) 3-(γ-chloro-β-hydroxy-propyl)-4-methyl-7,8-dimethoxy-coumarin, prepared according to the method described in British Pat. 1,135,907, Example 2, para. 2, and 30.3 g. (0.3 mol) tetrahydrofurfurylamine are dissolved in 200 cc. anhydrous dioxane and, after the addition of 15.2 g. (0.11 mol) potassium carbonate, heated during 12 hours under reflux, while stirring. The reaction solution is then sucked off, while hot, from the inorganic salts and the filtrate is evaporated to dryness in vacuo. The residue which separates in the form of crystals is triturated with little ethyl acetate, sucked off and dried. Obtained is the 3 - [γ-N-(tetrahydrofurfuryl)-amino-β-hydroxy-propyl]-4-methyl-7,8-dimethoxy-coumarin in the form of colorless crystals melting at 135°.

Yield: 26 g.=69% of the theoretical.

(b) 37.7 g. (0.1 mol) 3-[γ-N-(tetrahydrofurfuryl)-amino-β-hydroxy-propyl] - 4 - methyl-7,8-dimethoxy-coumarin are dissolved in 35 g. formic acid and then, while stirring and cooling, admixed at 0°–5° with an aqueous formaldehyde solution of 40%. Subsequently, the reaction mixture is heated to 100° and stirred at this temperature for 12 hours. After cooling down, 20 cc. concentrated hydrochloric acid are added. The excess formic acid is distilled off in vacuo and the residue is diluted with 200 cc. water. After filtration, the filtrate is rendered alkaline by the addition of potassium carbonate and the oily separating base is dissolved in ethyl acetate. The ethyl acetate solution is dried over potassium carbonate. By introducing gaseous hydrochloric acid into the ethyl acetate solution, one obtains the 3-[γ-N-methyl-N-(tetrahydrofurfuryl)-amino - β - hydroxy-propyl]-4-methyl-7,8-dimethoxy-coumarin hydrochloride in the form of colorless hygroscopic crystals having a decomposition point of 46°.

Yield: 30 g.=70.3% of the theoretical.

The following compound is obtained in the same manner: 3-[γ-N-methyl - N - furfuryl)-amino-β-3,4,5-trimethoxybenzoxy-propyl]-4-methyl-7,8-dimethoxy - coumarin hydrochloride, melting point: 85° with decomp.

The starting materials and intermediates for this compound are the 3-[γ-furfurylamino-β-hydroxy-propyl]-4-methyl-7,8-dimethoxy-coumarin, melting point: 112–115° and the 3-[γ-N-methyl-N-(furfuryl)-amino-β-hydroxy-propyl]-4-methyl-7,8-dimethoxy-coumarin hydrochloride, melting point: 50° with decomp.

What is claimed is:

1. A coumarin compound having the structural formula

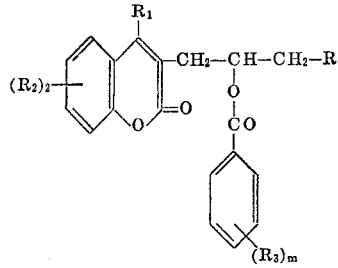

or the hydrochloric acid addition salt thereof, wherein R is selected from the group consisting of N—$C_1$—$C_4$—alkyl-N-furfurylamine and —$C_1$—$C_4$-alkyl-N-tetrahydrofurfurylamine; $R_1$ is selected from the group consisting of alkyl radicals having 1–4 carbon atoms; $R_2$ is selected from the group consisting of 5,7-, 6,7- and 7,8-positioned alkoxy groups having 1–4 carbon atoms; $R_3$ is selected from the group consisting of alkoxy groups having 1–4 carbon atoms; and $m$ is selected from the group consisting of 1, 2 and 3.

2. 3-[γ-(N-methyl - N - furfurylamino)-β-(3,4,5-trimethoxybenzoxy)-propyl]-4-methyl - 7,8 - dimethoxy-coumarin.

3. 3-[γ - (N - methyl - N - tetrahydrofurfurylamino)-β-(3,4,5-trimethoxybenzoxy)-propyl] - 4 - methyl-7,8-dimethoxy-coumarin.

References Cited

UNITED STATES PATENTS 3,264,323    8/1966    Kaminsky et al. ____ 260—343.2

JOHN M. FORD, Primary Examiner

U.S. Cl. X.R.

424—283